Patented Sept. 7, 1948

2,448,960

UNITED STATES PATENT OFFICE 2,448,960

METHOD OF MAKING A HYDROCARBON CONVERSION CATALYST

Gerald C. Connolly, Baton Rouge, La., assignor to Standard Oil Development Company, a corporation of Delaware No Drawing. Application October 2, 1942, Serial No. 460,484

3 Claims. (Cl. 252—250)

This invention relates to the conversion of hydrocarbon oils and pertains more particularly to the conversion of oils in the presence of a particular type of catalyst prepared as hereinafter described.

In my Patent No. 2,363,231, dated November 21, 1944, I have described a catalyst adapted for the conversion of hydrocarbon oils prepared by homogenizing alumina having a capillary structure either in hydrous or anhydrous form with the hydrous oxide of silicon, such as silica gel, gelatinous precipitate of silica or mixtures thereof, followed by drying the homogenized product.

I have now found that a catalyst having a high activity, particularly for cracking hydrocarbon oils, may be prepared by homogenizing ordinary commercial aluminum hydrates with the hydrous oxide of silicon and treating the product to convert the aluminum hydrate into adsorptive alumina.

The aluminum hydrates employed as one of the starting materials in the preparation of the catalyst form a well-known article of commerce and may comprise the monohydrate ($Al_2O_3.1H_2O$), dihydrate ($Al_2O_3.2H_2O$), or the trihydrate ($Al_2O_3.3H_2O$). The most common form is the trihydrate which is obtained as a by-product in metallurgical processes, such as in the separation of chromium from its ores. These products are available in large quantities at relatively low cost.

These products as obtained do not possess the necessary physical structure to produce highly active catalysts when mixed with the silica.

I have found, however, that mixed silica-aluminum hydrate catalysts may be converted into catalysts having a high level of activity by first homogenizing the aluminum hydrate with a hydrous oxide of silicon, thereafter treating the mixture with an acid such as sulfuric acid, thoroughly mixing the acid and silica-aluminum hydrate mixture, then partly drying the product to reduce the moisture to from 25% to 75%, and thereafter neutralizing with ammonia or other volatile base. The mass may be dried to 10% water content or lower but a complete drying is not resorted to because the resulting catalyst is not as effective as desired.

I have further found that, if the acid-treated mixture is treated directly with the volatile base such as ammonia without first partially drying, the resulting product has a materially lower order of activity. From this it is concluded that the partial drying treatment raises the temperature and concentration of the acid, causing it to react with the aluminum hydrate, although the effect of the partial drying treatment is not fully established.

In accordance with the preferred embodiment of the invention, a silica hydrogel is first prepared according to recognized procedure which briefly comprises reacting sodium silicate with an acid under conditions controlled to form a clear hydrosol which later sets into a firm hydrogel. This hydrogel is then broken into lumps and thoroughly washed to remove the alkali metal and other reaction impurities.

The resulting product is then placed in a ball mill and thoroughly mixed with the aluminum hydrate. The amount of aluminum hydrate and silica hydrogel entering into the mixture may be controlled to obtain a final product having the desired ratio of silica to alumina. This ratio may extend over a wide range but particularly desirable results are obtained by employing a mixture which will give a final product containing from 10% to 20% of alumina.

Following the mixing of the silica hydrogel with the hydrated aluminum, an acid solution is added to the mixture preferably in an amount which will theoretically react with the aluminum hydrate to form an aluminum salt. Sulfuric acid is particularly suitable for this treatment. After the addition of the acid the mixture may be thoroughly mixed, as in a ball mill.

The resulting mixture is then partially dried. For example, it is preferred to reduce the moisture to from 25% to 75% during this initial drying treatment, and preferably to between 50% and 60%. Following the partial drying treatment, the product is treated with ammonium hydroxide, preferably in an amount which is required to convert theoretically the aluminum salt back into the form of the oxide. In lieu of employing an ammonium hydroxide solution, ammonia gas or other volatile base may be used for this purpose. Following the treatment with the ammonia or the ammonium hydroxide, the product is again thoroughly washed with water and then dried according to conventional procedure. The resulting product may be employed either in a finely-divided or in molded state.

The following results are typical of those obtained by employing catalysts prepared as above described:

Example

A washed and purified silica hydrogel formed by reacting sodium silicate with sulfuric acid was mixed with an aluminum trihydrate. The amount of aluminum hydrate calculated as aluminum oxide in the mixture was about 13% on the dry basis. This product was then treated with sulfuric acid in an amount theoretically necessary to convert the aluminum oxide to the aluminum sulfate. Following the addition of the acid, the product was thoroughly mixed in a ball mill and then subjected to partial drying to reduce the water contained in the mixture to from 50% to 60%. Following this, the product was treated with ammonium hydroxide in an amount theoretically necessary to convert all of the aluminum sulfate into the alumina. Following the treatment with ammonium hydroxide the product was thoroughly washed, dried and molded into pellets. A portion of these products was heat treated at a temperature of 1000° F. for several hours. Another portion of the products was heat treated at a temperature of 1400° F. for several hours.

The product heat treated at 1000° F. had an apparent density of 0.641 as measured by the weight in grams per cubic centimeter of $\frac{3}{16}$" diameter pellets. The product treated at 1400° F. had an apparent density of 0.66. The cracking activity of the products which had been subjected to 1000° F. and 1400° F. heat treatment was determined by passing an East Texas gas oil of 33.8° A. P. I. gravity through a bed of catalytic material at a velocity of 0.6 volumes of catalyst per volume of oil by weight. The catalyst zone was maintained at 850° F. and the cracking operations were continued for a period of two hours.

Under the above conditions the product which had been subjected to 1000° F. heat treatment resulted in a 56 volume per cent conversion into gasoline. The product which had been subjected to 1400° F. heat treatment resulted in 48 volume per cent conversion into gasoline.

From the above it will be noted that catalysts of extraordinarily high activity may be prepared by the method outlined above.

While it is preferred to employ silica hydrogel as one of the ingredients in the preparation of the catalyst, gelatinous precipitate of silica may be employed in its stead. It has been found, however, that to produce a catalyst having a high order of activity it is important to subject the mixture first to partial drying following the acid treatment before treating with ammonium hydroxide. It has been found, for example, that by treating the product immediately following the acid treatment without any partial drying with the ammonium hydroxide followed by washing and then drying a catalyst is produced which, when tested under the conditions above outlined, results in about 28 volume per cent of gasoline. In another example in which the ammonium hydroxide was added immediately following the acid treatment without any partial drying and in which the resulting treated product was dried prior to the washing operation, the volume of gasoline formed was 35% when tested under the conditions above outlined.

The process as outlined is capable of considerable flexibilities and economies. Particularly is this true for large scale manufacture. For instance, the hydrogel may be only incompletely washed before the impregnation and all salts, including those from the manufacture and those resulting from the impregnations, washed from the dry catalyst. Also, if in the manufacture of the hydrogel some zeolitic soda is formed, deliberately or otherwise, this soda can be converted to the water-leachable salt by adding an amount of acid in excess of that theoretically necessary to react with the aluminum hydrate. Furthermore, the final leach of the partly dried catalyst can be so regulated that much of the ammonium sulfate can be obtained in a concentrated form, thereby suitable for use in certain mixed fertilizers, or the solutions can be evaporated to recover the ammonium sulfate in the solid or crystal form.

Having described the preferred embodiment of the invention, it will be understood that it embraces such other variations and modifications as come within the spirit and scope thereof.

What is desired to be protected by Letters Patent is:

1. Process of preparing a catalyst adapted for the conversion of hydrocarbon oils, which comprises intimately mixing solid aluminum hydrate with a gelatinous hydrous oxide of silicon and with sulfuric acid, thereafter drying the acid-treated mixture to an extent sufficient only to concentrate the acid substantially and to form aluminum sulfate, adding a volatile base to the partially dried mixture, and thereafter washing and drying the resulting product.

2. Process of preparing a catalyst adapted for the conversion of hydrocarbon oils, which comprises forming an intimate mixture of solid aluminum hydrate, gelatinous hydrous oxide of silicon and sulfuric acid, thereafter drying the mixture to an extent sufficient only to concentrate the acid substantially and to remove a substantial amount of water from the hydrous oxide of silicon, adding a volatile base to react with the aluminum sulfate, and washing and drying the resulting product.

3. In the process defined by claim 2, the further improvement which comprises employing ammonia as the volatile base.

GERALD C. CONNOLLY.

REFERENCES CITED

The following references are of record in the file of this patent:

UNITED STATES PATENTS

| Number | Name | Date |
|---|---|---|
| 209,488 | Lewis | Oct. 29, 1878 |
| 2,085,129 | Stoewener | June 29, 1937 |
| 2,212,035 | Morrell et al. | Aug. 20, 1940 |
| 2,285,314 | Thomas et al. | June 2, 1942 |
| 2,324,518 | Klein et al. | July 20, 1943 |
| 2,330,640 | Teter | Sept. 28, 1943 |